United States Patent
Tanaka et al.

(10) Patent No.: US 8,294,914 B2
(45) Date of Patent: Oct. 23, 2012

(54) IMAGE FORMING APPARATUS AND METHOD FOR CHANGING NUMBER OF LINES IN BAND BUFFER BASED ON MEMORY SIZE TO BE REQUIRED

(75) Inventors: Yoshinori Tanaka, Hachioji (JP); Masahiro Ozawa, Hachioji (JP); Hiroshi Nogawa, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/182,927

(22) Filed: Jul. 14, 2011

(65) Prior Publication Data
US 2012/0236343 A1 Sep. 20, 2012

Related U.S. Application Data

(62) Division of application No. 11/699,486, filed on Jan. 30, 2007, now Pat. No. 8,054,478.

(30) Foreign Application Priority Data

Jul. 24, 2006 (JP) .................................. 2006-200697

(51) Int. Cl.
  *G06F 3/12* (2006.01)
(52) U.S. Cl. ..... 358/1.13; 345/592; 358/1.16; 358/1.17; 382/232
(58) Field of Classification Search .................. 358/1.13, 358/1.1, 1.16, 404; 345/592, 544, 553; 382/232
See application file for complete search history.

(56) References Cited

U.S. PATENT DOCUMENTS

| | | | | |
|---|---|---|---|---|
| 5,987,230 A | * | 11/1999 | Shimizu | 358/1.16 |
| 6,040,917 A | * | 3/2000 | Campbell et al. | 358/1.17 |
| 6,359,700 B1 | * | 3/2002 | Briggs | 358/1.17 |
| 7,408,549 B1 | * | 8/2008 | Mahan et al. | 345/422 |
| 2002/0150307 A1 | | 10/2002 | Hamburg | |
| 2003/0193681 A1 | * | 10/2003 | Kumar | 358/1.13 |

(Continued)

FOREIGN PATENT DOCUMENTS

JP 2009-001873 1/1997

(Continued)

OTHER PUBLICATIONS

Decision of Refusal in JP 2006-200697 dated Feb. 3, 2009, and an English translation thereof.

(Continued)

*Primary Examiner* — King Poon
*Assistant Examiner* — David S Cammack
(74) *Attorney, Agent, or Firm* — Buchanan Ingersoll & Rooney PC

(57) ABSTRACT

Disclosed herein is an image forming apparatus, including: a language analysis unit for analyzing print data and generating data having an intermediate format between the print data and bitmap data generated based on the print data; an image processing unit for rasterizing the generated data having the intermediate format for each band by using the predetermined number of lines and generating the bitmap data; a memory for holding the data for which rasterizing processing is being performed by the image processing unit; a printing unit for performing printing based on the generated bitmap data; and a number-of-line switching unit for switching the number of lines of the band in the rasterizing processing of the image processing unit according to whether the print data is data that can include transparency processing data or not.

3 Claims, 14 Drawing Sheets

U.S. PATENT DOCUMENTS

| | | | |
|---|---|---|---|
| 2004/0145586 A1* | 7/2004 | Jacobsen | 345/441 |
| 2005/0254713 A1* | 11/2005 | Wakana | 382/232 |
| 2008/0030760 A1* | 2/2008 | Tanaka et al. | 358/1.13 |

FOREIGN PATENT DOCUMENTS

| | | |
|---|---|---|
| JP | 2009-164731 | 6/1997 |
| JP | 2001-005987 | 1/2001 |
| JP | 2005-182692 | 7/2005 |
| JP | 2005182692 A * | 7/2005 |
| JP | 2005-260630 | 9/2005 |
| JP | 2006-013590 | 1/2006 |

OTHER PUBLICATIONS

Notification of Reason for Refusal in JP 2006-200697 dated Jul. 28, 2009, and an English Translation thereof.

* cited by examiner

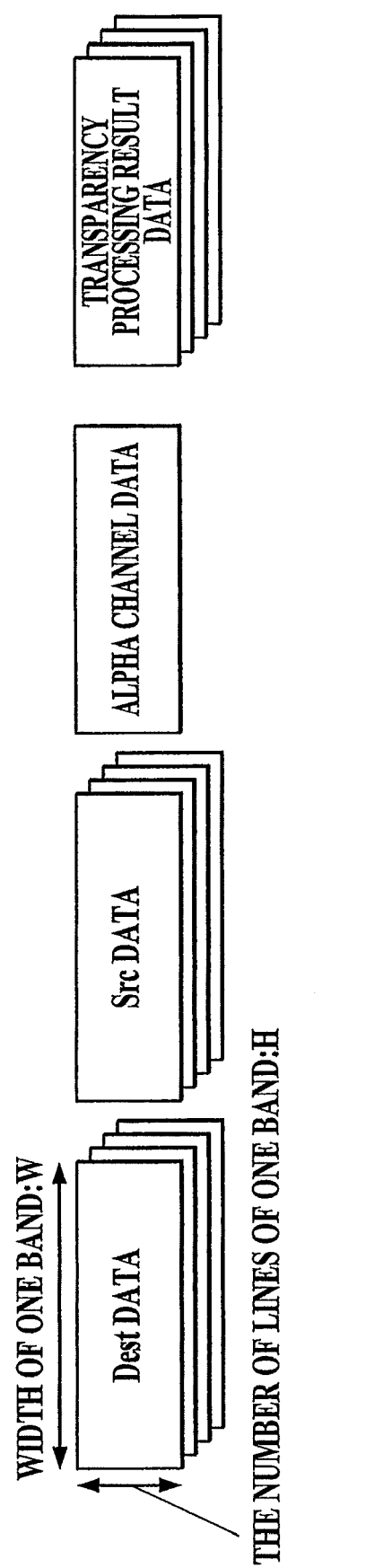

IMAGE FORMING APPARATUS AND METHOD FOR CHANGING NUMBER OF LINES IN BAND BUFFER BASED ON MEMORY SIZE TO BE REQUIRED

RELATED APPLICATIONS

This application is a divisional of U.S. application Ser. No. 11/699,486, filed on Jan. 30, 2007 now U.S. Pat. No. 8,054,478, which claims priority from Japanese Application No. 2006-200697, filed on Jul. 24, 2006, the contents of which are herein incorporated in their entirety by reference.

BACKGROUND OF THE INVENTION

1. Field of the Invention

The present invention relates to an image forming apparatus, an image forming method and a recording medium, for converting print data into bitmap data to print the data.

2. Description of Related Art

In recent years, there have been widespread image forming apparatuses such as a printer and a multi function peripheral (MFP) for once converting print data received from an external apparatus such as a personal computer (PC) into data having an intermediate format (hereinafter, referred to as intermediate data), rasterizing the intermediate data to generate bitmap data, and printing the data. In such an image forming apparatus, one page is divided into a plurality of bands for each predetermined number of lines, and the rasterizing processing is performed.

For example, there has been proposed a technology in which a sub-band memory is provided in an image expanding device using alternately two band memories for expanding an image and in which when an image is complicated and takes time to be expanded, the image is rasterized in advance (refer to JP-Tokukai-H09-001873A). When the intermediate data is generated, it is determined whether the image is expanded to the sub-band memory or not.

FIG. 13 shows a memory size required to hold bitmap data for one band. As shown in FIG. 13, when the width of one band is W and the number of lines of one band is H, a memory size of (W×H×4) [Bytes] for one band is required for four planes of CMYK in the case of a color image forming apparatus. In general, the image forming apparatus comprises a memory for two bands, which is used as a memory area for the rasterizing processing and as a memory area for transferring the rasterized data to a printer engine.

Incidentally, as image forming apparatuses capable of directly printing a portable document format (PDF) data have been being increased, drawing functions of the PDF have also been more complicated. As one of the drawing functions of the PDF, there is a transparency function.

As shown in FIG. 14, the transparency function of the PDF is a function to perform processing (hereinafter, referred to as transparency processing) for allowing newly added source data (hereinafter, referred to as Src data) to be transparent on destination data (hereinafter, referred to as Dest data) which is a background, according to alpha channel data indicating the opacity. The alpha channel data may be one to designate the opacity for each pixel, or may be one to have the fixed opacity.

In the case of performing the transparency processing, as shown in FIG. 15, it is necessary to hold all of the Dest data, the Src data, the alpha channel data and transparency processing result data on the memory. Accordingly, the enormous memory size becomes necessary. In the case of the color image forming apparatus, the Dest data, the Src data, and the transparency processing result data have four planes of the CMYK, respectively. Accordingly, the following memory size is further required:

$$\{(W \times H \times 4)+(W \times H \times 4)+(W \times H)+(W \times H \times 4)\} \text{ [Byte]}$$

For example, as shown in FIG. 16A, when print data (width: 4960 pixels; the number of lines: 7000 lines) having a resolution of 600 dots per inch (dpi) on a sheet of the A4 size is processed for one band having the number of lines of 256, the memory size required to hold the bitmap data for one band is as follows:

$$(4960 \times 256 \times 4) \text{ [Byte]} = 4.8 \text{ [MByte]}$$

for four planes of the CMYK.

In the case of performing the transparency processing, as shown in FIG. 16B, the following memory size is further required:

$$\{(4960 \times 256 \times 4) \text{ for Dest data}\} \text{ [Byte]}$$

$$\{(4960 \times 256 \times 4) \text{ for Src data}\} \text{ [Byte]}$$

$$\{(4960 \times 256) \text{ for alpha channel data}\} \text{ [Byte]}$$

$$\{(4960'256'4) \text{ for transparency processing result data}\} \text{ [Byte]}$$

$$= 15.7 \text{ [MByte]}$$

In general, even though a rasterizing area for two bands is ensured, the memory size of 9.7 [MByte] is only required. However, in the case of performing the transparency processing, the memory size of 15.7 [MByte] becomes additionally necessary at the minimum. Moreover, in the case of further using the transparency processing result data obtained by the transparency processing as the Dest data or the Src data, a larger memory size is required. Hence, it is necessary to ensure a large memory size in order to deal with the transparency processing.

However, in the image forming apparatus such as the printer, the MFT or the like, the size of memory which can be mounted on the apparatus is limited. Accordingly, when the print data includes data (hereinafter, referred to as transparency processing data) for use in the transparency processing, such as the Dest data, the Src data, and the alpha channel data, a shortage of the memory may occur.

SUMMARY

The present invention has been made in consideration for the foregoing problem in the above-described related art. An object of the present invention is to perform the rasterizing processing by using a small size of the memory even though the print data includes the transparency processing data.

To achieve at least one of the abovementioned objects, an image forming apparatus reflecting a first aspect of the present invention comprises: a language analysis unit for analyzing print data and generating data having an intermediate format between the print data and bitmap data generated based on the print data; an image processing unit for rasterizing the generated data having the intermediate format for each band by using the predetermined number of lines and generating the bitmap data; a memory for holding the data for which rasterizing processing is being performed by the image processing unit; a printing unit for performing printing based on the generated bitmap data; and a number-of-line switching unit for switching the number of lines of the band in the rasterizing processing of the image processing unit according to whether the print data is data that can include transparency processing data or not.

Preferably, when the print data is the data that can include the transparency processing data, the number-of-line switching unit switches the number of lines to the smaller number of lines as compared with a case where the print data is not the data that can include the transparency processing data.

An image forming apparatus reflecting a second aspect of the present invention comprises: a language analysis unit for analyzing print data and generating data having an intermediate format between the print data and bitmap data generated based on the print data; an image processing unit for rasterizing the generated data having the intermediate format for each band by using the predetermined number of lines and generating the bitmap data; a memory for holding the data for which rasterizing processing is being performed by the image processing unit; a printing unit for performing printing based on the generated bitmap data; and a number-of-line switching unit for switching the number of lines of the band in the rasterizing processing of the image processing unit according to whether each page of the print data includes transparency processing data or not.

Preferably, in case of a page including the transparency processing data, the number-of-line switching unit switches the number of lines to the smaller number of lines as compared with a page that does not include the transparency processing data.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 15 is a view showing the memory size required to perform the conventional transparency processing;

DETAILED DESCRIPTION OF THE PREFERRED EMBODIMENT

First Embodiment

First, a first embodiment of the present invention will be explained in detail.

Figure 1:
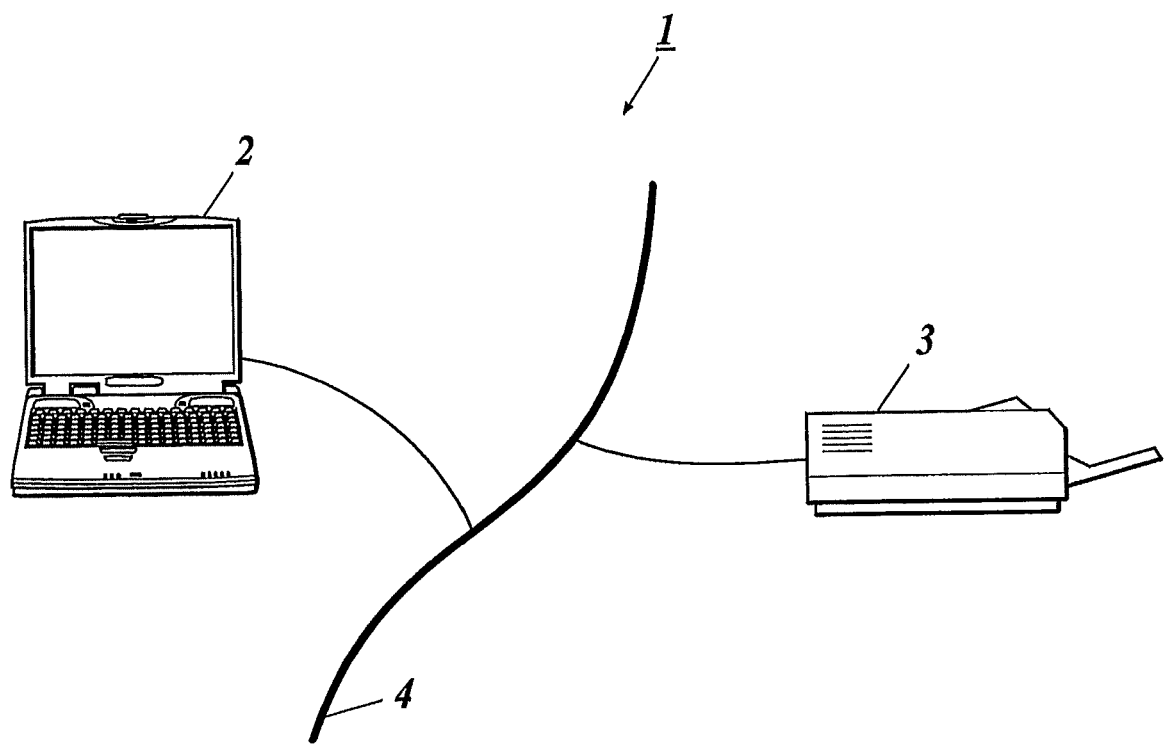
FIG. 1 is a configuration diagram of an image forming system 1 in a first embodiment.

FIG. 1 shows a configuration of an image forming system 1 of the first embodiment.

As shown in FIG. 1, the image forming system 1 comprises a PC 2 and an image forming apparatus 3. The PC 2 and the image forming apparatus 3 are communicably connected to each other through a local area network (LAN) 4.

Figure 2:
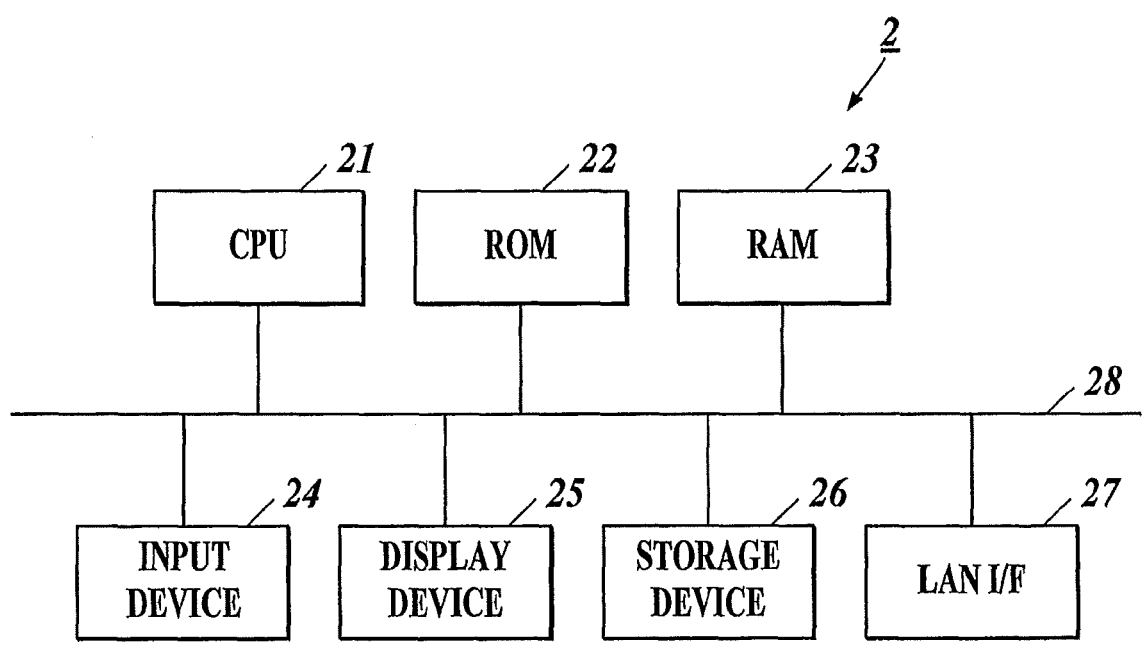
FIG. 2 is a block diagram showing a functional configuration of a PC 2.

FIG. 2 shows a functional configuration of the PC 2.

As shown in FIG. 2, the PC 2 comprises a central processing unit (CPU) 21, a read only memory (ROM) 22, a random access memory (RAM) 23, an input device 24, a display device 25, a storage device 26, and a LAN interface (UF) 27. Each unit is connected with the others by a bus 28.

The CPU 21 expands various processing programs and data which are stored in the ROM 22 or the storage device 26, to the RAM 23 and performs a centralized control for operations of each unit of the PC 2 based on the programs.

The ROM 22 stores the various processing programs, the data for use in the various processing, and the like.

The RAM 23 forms a work area for temporarily storing the various processing programs executed by the CPU 21 and the data relating to these programs.

The input device 24 comprises a keyboard having number keys, character keys, function keys and the like, a mouse and the like, and outputs operation signals corresponding to operations thereof.

The display device 25 comprises a liquid crystal display (LCD) or the like, and displays various display information of an operation screen, a processing result, and the like in accordance with instructions from the CPU 21.

The storage device 26 stores various application programs, parameters and data which are necessary for the processing of the CPU 21, and various information such as the processing result of the CPU 21. As the application programs, Microsoft (registered trademark), Word, Adobe (registered trademark), Acrobat (registered trademark), and the like are exemplified.

The LAN I/F 27 is a communication interface, such as a network interface card (NIC) and a modem, for connecting to the LAN 4. For example, the LAN I/F 27 transmits a printing request and print data to the image forming apparatus 3.

Figure 3:
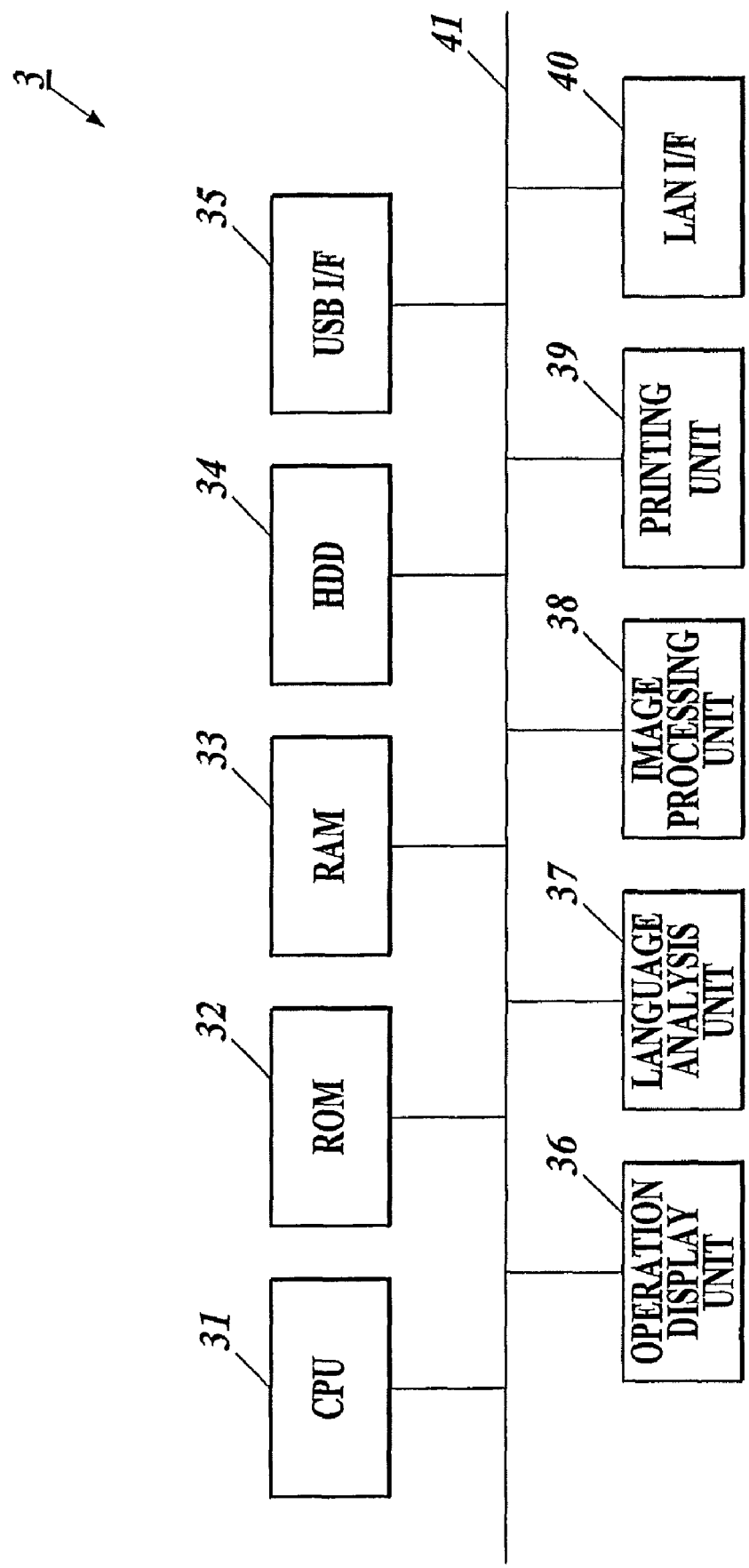
FIG. 3 is a block diagram showing a functional configuration of an image forming apparatus 3.

FIG. 3 shows a functional configuration of the image forming apparatus 3.

As shown in FIG. 3, the image forming apparatus 3 comprises a CPU 31, a ROM 32, a RAM 33, a hard disk drive (HDD) 34, a universal serial bus (USB) I/F 35, an operation display unit 36, a language analysis unit 37, an image processing unit 38, a printing unit 39, and a LAN I/F 40. Each unit is connected with the others by a bus 41.

The CPU 31 expands various processing programs and data which are stored in the ROM 32, to the RAM 33, and performs a centralized control for operations of the each unit of the image forming apparatus 3 based on the programs.

The ROM 32 stores the various processing programs for controlling an operation of the entire image forming apparatus 3, the data for use in the various processings, and the like.

The RAM 33 forms a work area for temporarily storing the various processing programs executed by the CPU 31 and the data relating to these programs. For example, the RAM 33 holds data during the rasterizing processing by the image processing unit 38.

The HDD 34 is a storage device for storing various data, and stores data of a confidential print job and the like.

The USB I/F 35 is an interface for connecting to a USB memory.

The operation display unit 36 comprises an LCD, a touch panel provided so as to cover the LCD, an operation key group, and the like. The operation display unit 36 displays various setting screens including an icon and a key button, various processing results, and the like on the LCD in accordance with display signals inputted from the CPU 31, and outputs an operation signal inputted from the operation key group or the touch panel to the CPU 31.

The language analysis unit 37 analyzes the print data inputted from the PC 2, and generates intermediate data between the print data and bitmap data (language analysis processing). The language analysis unit 37 is realized by software processing by the cooperation between the CPU 31 and the programs stored in the ROM 32.

The print data is data of a page description language (PDL) (hereinafter, referred to as PDL data)-format such as PostScript (PS: registered trademark) and PCLXL, PDF data, or the like.

The intermediate data is data before the print data is expanded to the bitmap data obtained by performing the language analysis processing, and can be stored in a smaller capacity than the bitmap data. The intermediate data is generated according to features of objects (text data, graphics data, image data, and the like) included in the print data. For example, data of a vector format is exemplified as the intermediate data of the text data and the graphics data, and data of an image format is exemplified as the intermediate data of the image data.

Moreover, the language analysis unit 37 determines whether the print data inputted from the PC 2 is the PDF data or not, and changes the number of lines of the band in the rasterizing processing of the image processing unit 38 according to whether the print data is the PDF data or not.

Figure 4:
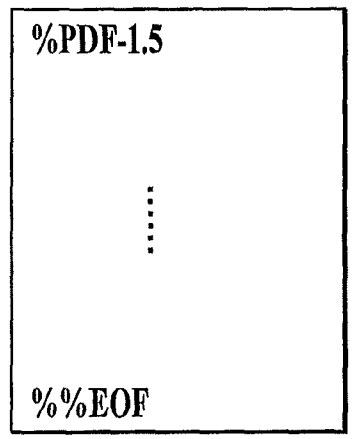
FIG. 4 is a view for explaining a method for determining whether print data is PDF data or not.

For example, as shown in FIG. 4, the head of the print data is referred, and it is determined that the print data is the PDF data when there is data indicating "% PDF". Then, the number of lines of the band in the rasterizing processing is set to a half of the usual number of lines. Meanwhile, when there is not the data indicating "% PDF" on the head of the print data, it is determined that the print data is not the PDF data, and the number of lines of the band in the rasterizing processing is set to the usual number of lines. The value "1.5" of "% PDF-1.5" is a version of the PDF specifications, and the values are different depending on the version.

The image processing unit 38 rasterizes the intermediate data generated by the language analysis unit 37 for each band having the predetermined number of lines, and generates the Next, the operation in the image forming apparatus 3 will printable bitmap data (image processing). The image processing unit 38 is realized by the software processing by the cooperation between the CPU 31 and the programs stored in the ROM 32.

The printing unit 39 performs printing on a recording medium based on the bitmap data generated by the image processing unit 38. Specifically, the printing unit 39 comprises a photoconductive drum as an image carrier, a charging unit for electrically charging the photoconductive drum, an exposure unit for exposing and scanning a surface of the photoconductive drum based on the bitmap data, a developing unit for attaching toner onto the photoconductive drum, a transfer unit for transferring a toner image formed on the photoconductive drum to the recording medium, a cleaning unit for removing residual toner on the photoconductive drum, and a fixing unit for fixing the toner image formed on the recording medium.

The LAN I/F 40 is a communication interface, such as the NIC and the modem, for connecting to the LAN 4, and receives the printing request and the print data from the PC 2.

Next, the operation in the image forming apparatus 3 will be explained.

Figure 5:
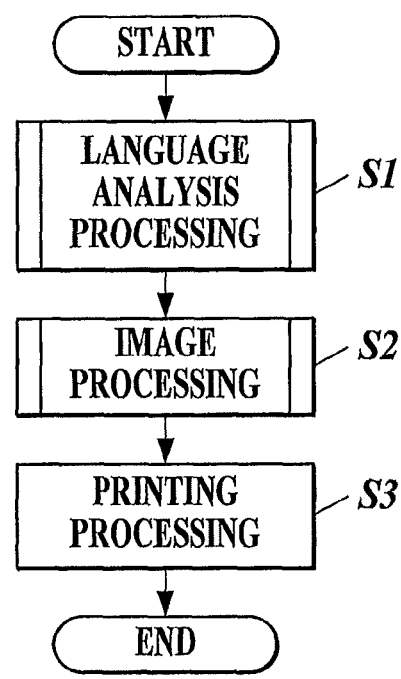
FIG. 5 is a main flowchart at the printing by the image forming apparatus 3.

FIG. 5 is a main flowchart at the printing by the image forming apparatus 3.

First, when the print data (PDF data or PDL data such as PS and PCLXL) is inputted from the PC 2 through the I/F 40 to the image forming apparatus 3, the language analysis unit 37 analyzes the print data, and generates the intermediate data/ (language analysis processing) (Step Si).

Subsequently, the intermediate data is rasterized for each band, and the bitmap data is generated (image processing) (Step S2).

Then, the generated bitmap data is outputted from the CPU 31 to the printing unit 39, and printing processing is performed by the printing unit 39 based on the bitmap data (Step S3).

Figure 6:
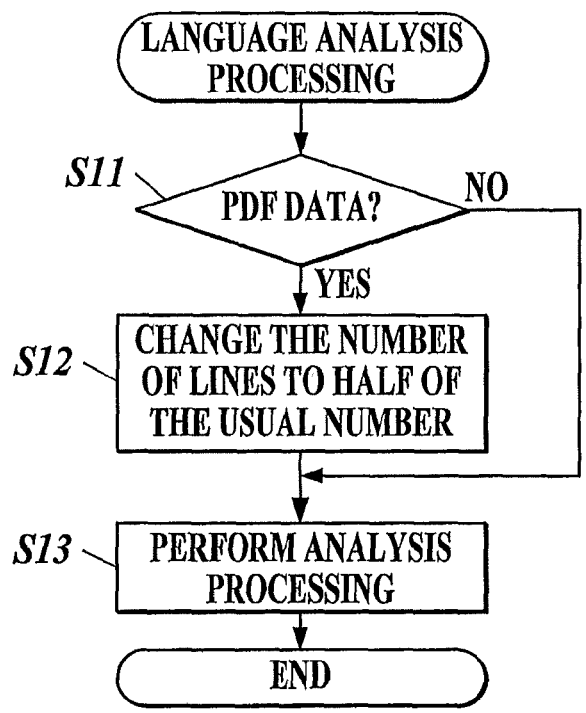
FIG. 6 is a flowchart showing the language analysis processing in the first embodiment.

Hereinafter, each processing will be explained. FIG. 6 is a flowchart showing the language analysis processing.

As shown in FIG. 6, first, it is determined by the language analysis unit 37 whether the print data inputted from the PC 2 is the PDF data or not (Step 511).

When it is determined that the print data is the PDF data (Step S11; Yes), the number of lines of the band in the rasterizing processing of the image processing unit 38 is changed to a half of the usual number of lines (Step S12).

After Step S12 or when it is determined in Step S11 that the print data is not the PDF data (Step S11; No), the language analysis unit 37 analyzes the print data, and generates the intermediate data (Step S13).

Then, the language analysis processing is finished.

Figure 7:
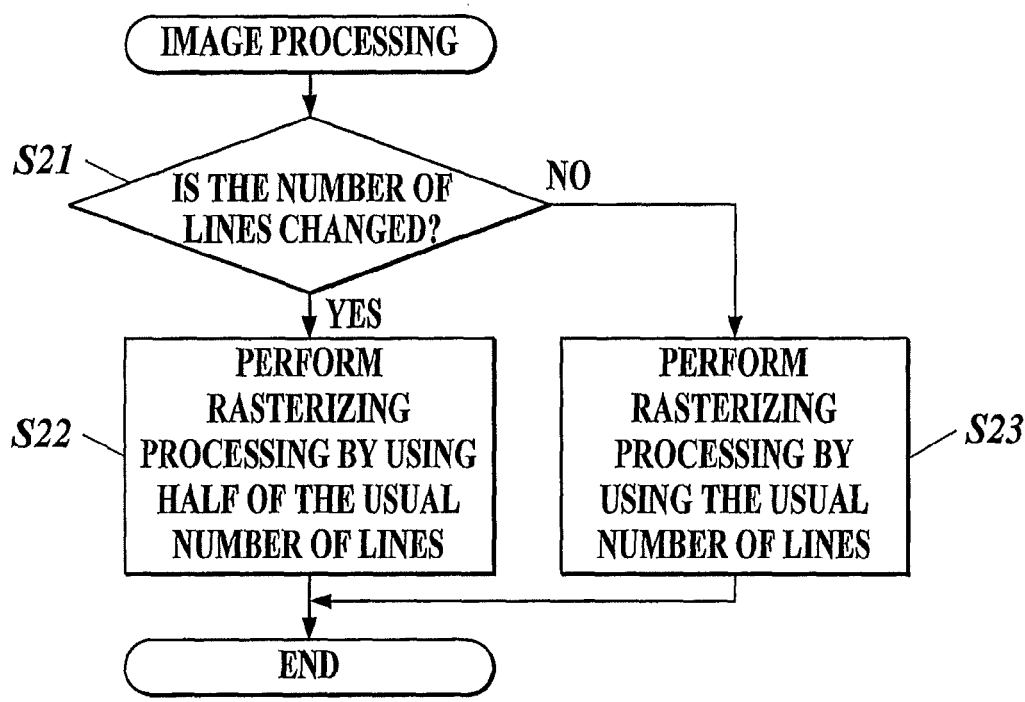
FIG. 7 is a flowchart showing the image processing in the first embodiment.

Next, the image processing will be explained with reference to FIG. 7.

First, it is determined by the image processing unit 38 whether the number of lines of the band is changed in the language analysis processing or not (Step S21).

When the number of lines of the band is changed (Step S21; Yes), the rasterizing processing is performed for each band having a half of the usual number of lines, and the bitmap data is generated (Step S22). In the rasterizing processing, the data for which the rasterizing processing is being performed, is held in the RAM 33.

Meanwhile, when the number of lines of the band is not changed (Step S21; No), the rasterizing processing is performed for each band having the usual number of lines, and the bitmap data is generated (Step S23). In the rasterizing processing, the data for which the rasterizing processing is being performed, is held in the RAM 33.

Then, the image processing is finished.

Figure 8A:
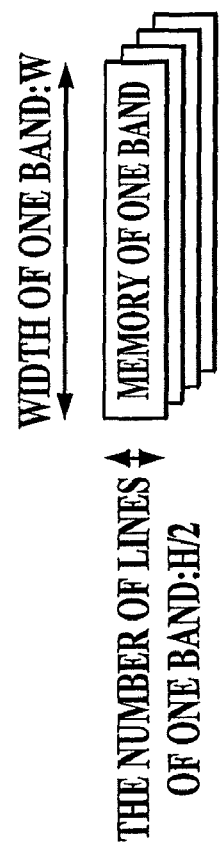
FIG. 8A is a view showing the memory size required to hold bitmap data for one band having the usual number of lines.

For example, as shown in FIG. 8A, in case that the usual number of lines, a rasterizing area is ensured in the RAM 33 so as to define a width of one band as W and define the number of lines rasterizing processing is performed for each band having the of one band as H, and the bitmap data obtained by rasterizing the intermediate data is stored in the rasterizing area.

Figure 8B:
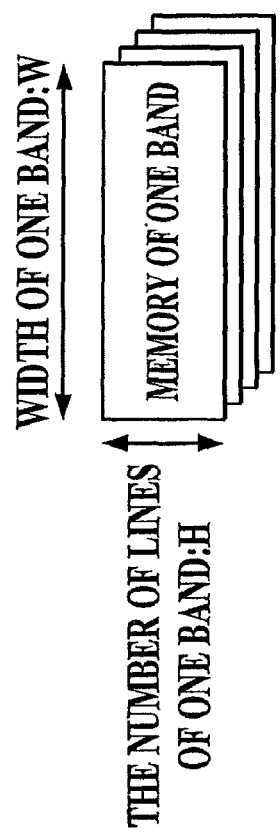
FIG. 8B is a view showing the memory size required to hold bitmap data for one band having a half of the usual number of lines.

Meanwhile, in case that it is determined in the language analysis processing that the print data is the PDF data, as shown in FIG. 8B, the rasterizing area is ensured in the RAM 33 so as to define the number of lines of one band as the half of the usual number of lines (H/2 lines), and the bitmap data obtained by rasterizing the intermediate data is stored in the rasterizing area.

Figure 9:
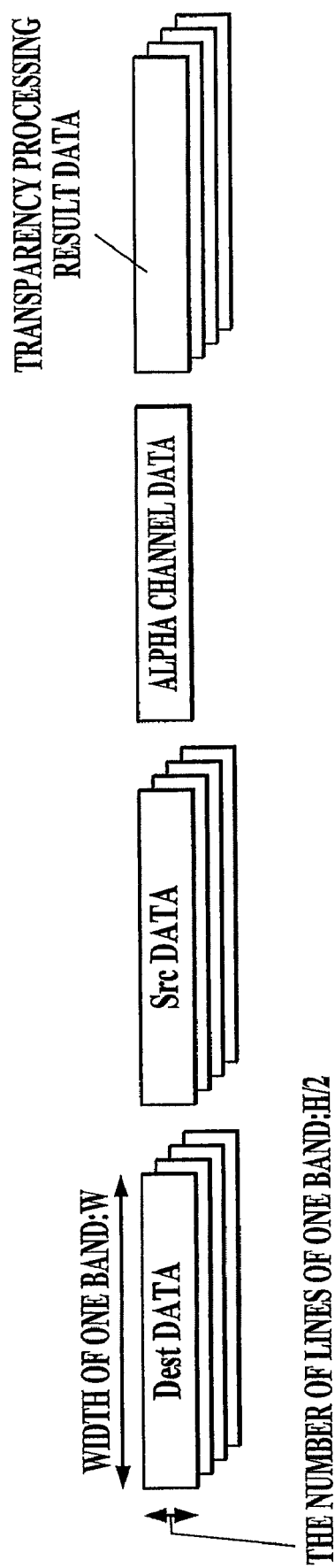
FIG. 9 is a view showing the memory size required to perform transparency processing in the rasterizing processing of the PDF data.

In the case of performing transparency processing in the rasterizing processing of the PDF data, as shown in FIG. 9, Dest data, Src data, alpha channel data, and transparency processing result data are held in the RAM 33 as the data for which the rasterizing processing is being performed. The Dest data, the Src data, and the transparency processing result data are required for four planes of CMYK. Accordingly, the following memory size of the RAM 33 is further required:

$$\{(w \times H/2 \times 4) + (W \times H/2 \times 4) + (W \times H/2) + (w \times H/2 \times 4)\}$$
$$[Byte].$$

As compared with the conventional case shown in FIG. 15, the memory size to be ensured in the RAM 33 can be reduced to a large extent.

Figure 10A:
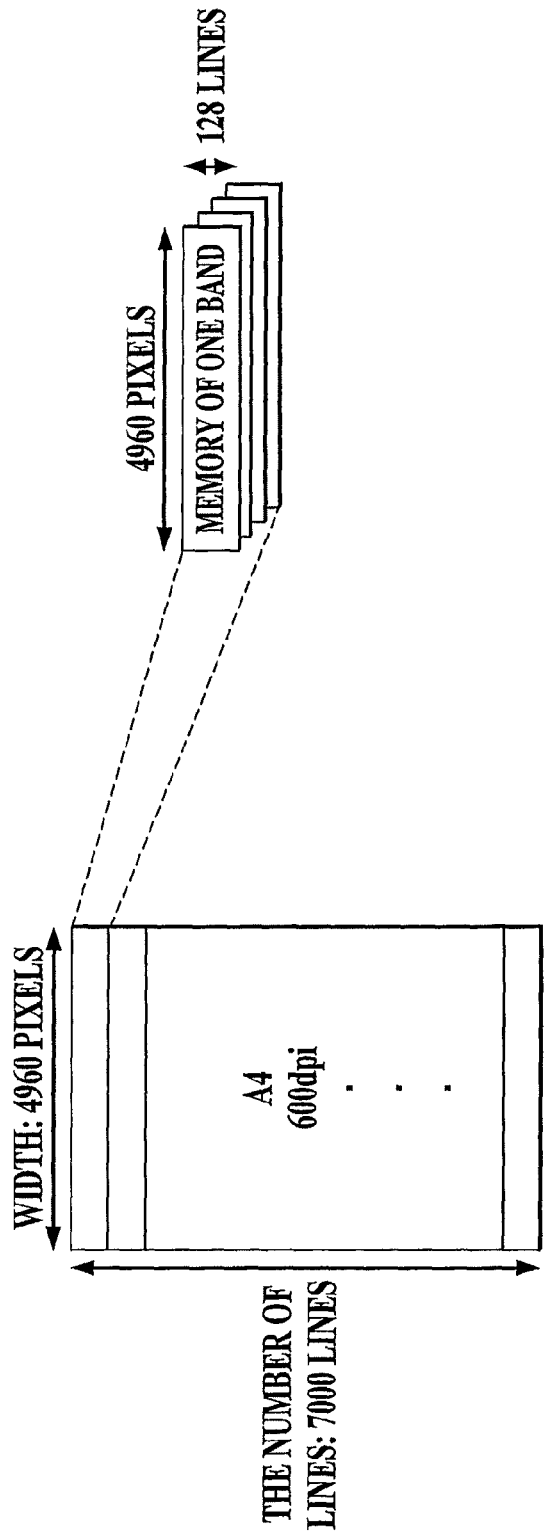
FIG. 10A is a specific example of the memory size required to hold the bitmap data for one band in a case of reducing the number of lines for one band to a half of the usual number.

Here, the case of setting the usual number of lines H of one band to 256 lines, will be explained as an example. As shown in FIG. 10A, in the case that the rasterizing processing is performed for the print data (width: 4960 pixels; the number of lines: 7000 lines) having a resolution of 600 dots per inch (dpi) on a sheet of the A4 size, when the number of lines of one band is set to 128 lines which is a half of the usual number, the memory size required to hold the bitmap data for one band is as follows:

$$(4960 \times 128 \times 4) [Byte] = 2.4 [MByte]$$

for four planes of the CMYK.

Figure 10B:
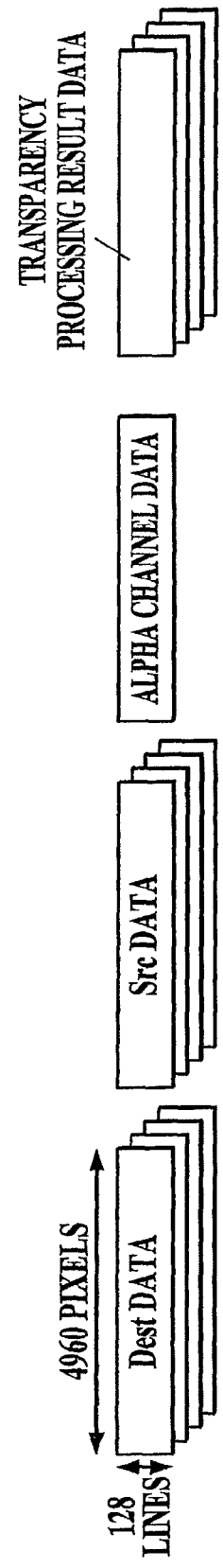
FIG. 10B is a specific example of the memory size required to perform the transparency processing in the case of reducing the number of lines for one band to a half of the usual number.

In the case of performing the transparency processing, as shown in FIG. 10B, it is necessary to hold all of the Dest data, the Src data, the alpha channel data and the transparency processing result data on the RAM 33. Accordingly, the following memory size is further required:

$$\{(4960 \times 128 \times 4) \text{ for Dest data}\} [Byte]$$

$$\{(4960 \times 128 \times 4) \text{ for Src data}\} [Byte]$$

$$\{(4960 \times 128) \text{ for alpha channel data}\} [Byte]$$

$$\{(4960 \times 128 \times 4) \text{ for transparency processing result data}\} [Byte]$$

$$=7.9 [MByte]$$

As described above, the number of lines of the band in the rasterizing processing is changed to a half of the usual number for the PDF data. Therefore, the required memory size is also halved as compared with the case of performing the rasterizing processing for each band having the usual number of lines.

As described above, according to the image forming apparatus 3 in the first embodiment, it is determined whether the print data is the PDF data (data which can include the transparency processing data) or not. When the print data is the PDF data, the number of lines is switched to the smaller number as compared with the case that the print data is not the PDF data. Accordingly, even though the PDF data including the transparency processing data is inputted to the image forming apparatus 3, the rasterizing processing can be performed by using the small memory size.

In the first embodiment, the number of lines of the band in the rasterizing processing is set to a half of the usual number of lines when the print data is the PDF data. However, by setting the number of lines to the smaller number, it is possible to further reduce the memory size required at the rasterizing processing.

Second Embodiment

Next, a second embodiment to which the present invention is applied, will be explained.

An image forming system in the second embodiment has a similar configuration to the image forming system 1 shown in the first embodiment. Accordingly, the same reference numerals are assigned to the same units, and the illustrations and the explanations therefor are omitted. The characteristic configuration and processing in the second embodiment will be explained.

In the first embodiment, the number of lines of the band in the rasterizing processing by the image processing unit 38 is switched according to whether the print data is the PDF data or not. However, in the second embodiment, the number of lines of the band in the rasterizing processing by the image processing unit 38 is switched according to whether each page of the print data includes the transparency processing data or not.

The language analysis unit 37 determines whether the print data inputted from the PC 2 is the PDF data or not. When the print data is the PDF data, the language analysis unit 37 analyzes the whole print data and determines whether each page includes the transparency processing data or not. Then, the language analysis unit 37 switches the number of lines of the band in the rasterizing processing by the image processing unit 38 according to whether each page includes the transparency processing data or not.

For example, it is determined that a certain page of the PDF data transparency processing data when the following command:

[/SMask<</S/Alpha/G {myform}>>/SetTransparency pdfmark]

is included in the page. Then, the number of lines of the band in the rasterizing processing is set to a half of the usual number of lines. When the above-described command is not included, it is determined that the transparency processing data is not included. The number of lines of the band in the rasterizing processing is set to the usual number of lines.

Next, the operation in the image forming apparatus 3 of the second embodiment will be explained.

A main flowchart for the printing is the same as that of the first embodiment shown in FIG. 5. Accordingly, the illustration and explanation therefor are omitted.

Figure 11:
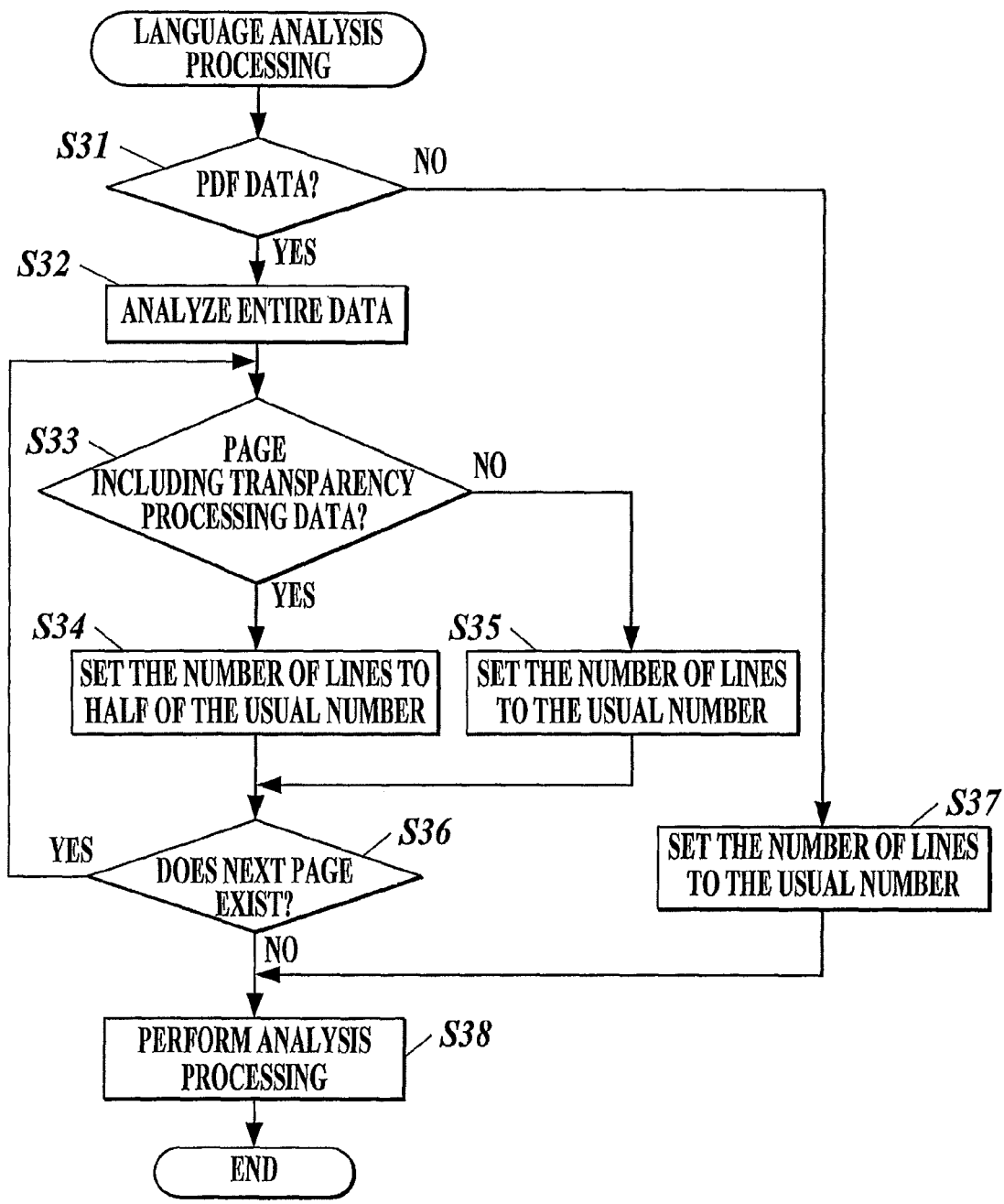
FIG. 11 is a flowchart showing the language analysis processing in a second embodiment.

FIG. 11 is a flowchart showing the language analysis processing.

As shown in FIG. 11, first, it is determined by the language analysis unit 37 whether the print data inputted from the PC 2 is the PDF data or not (Step S31). For example, as shown in FIG. 4, the head of the print data is referred, and it is determined whether the print data is the PDF data or not based on whether the data representing "% PDF" exists or not.

When it is determined that the print data is the PDF data (Step 31; Yes), the whole PDF data is analyzed by the language analysis unit 37 (Step S32), and it is determined from a head page whether each page of the print data includes the transparency processing data or not (Step S33).

When it is determined that a certain page of the print data includes the transparency processing data (Step S33; Yes), the number of lines of the band in the rasterizing processing for the page is set to a half of the usual number of lines (Step S34). Meanwhile, when it is determined that the certain page of the print data does not include the transparency processing data (Step S33; No), the number of lines of the band in the rasterizing processing for the page is set to the usual number of lines (Step S35). Specifically, each page number and the number-of-line information indicating the half of the usual number of lines or the usual number of lines are stored in the RAM 33 so as to relate to each other.

When the next page exists (Step S36; Yes), the language analysis processing returns to Step S33. The processing for each page is repeated.

In Step S31, when it is determined that the print data is not the PDF data (Step S31; No), the number of lines of the band in the rasterizing processing for the whole print data is set to the usual number of lines (Step S37).

When the next page does not exist in Step S36 (Step S36; No), or after Step S37, the language analysis unit 37 analyzes the print data and generates the intermediate data (Step S38). Then, the language analysis processing is finished.

Figure 12:
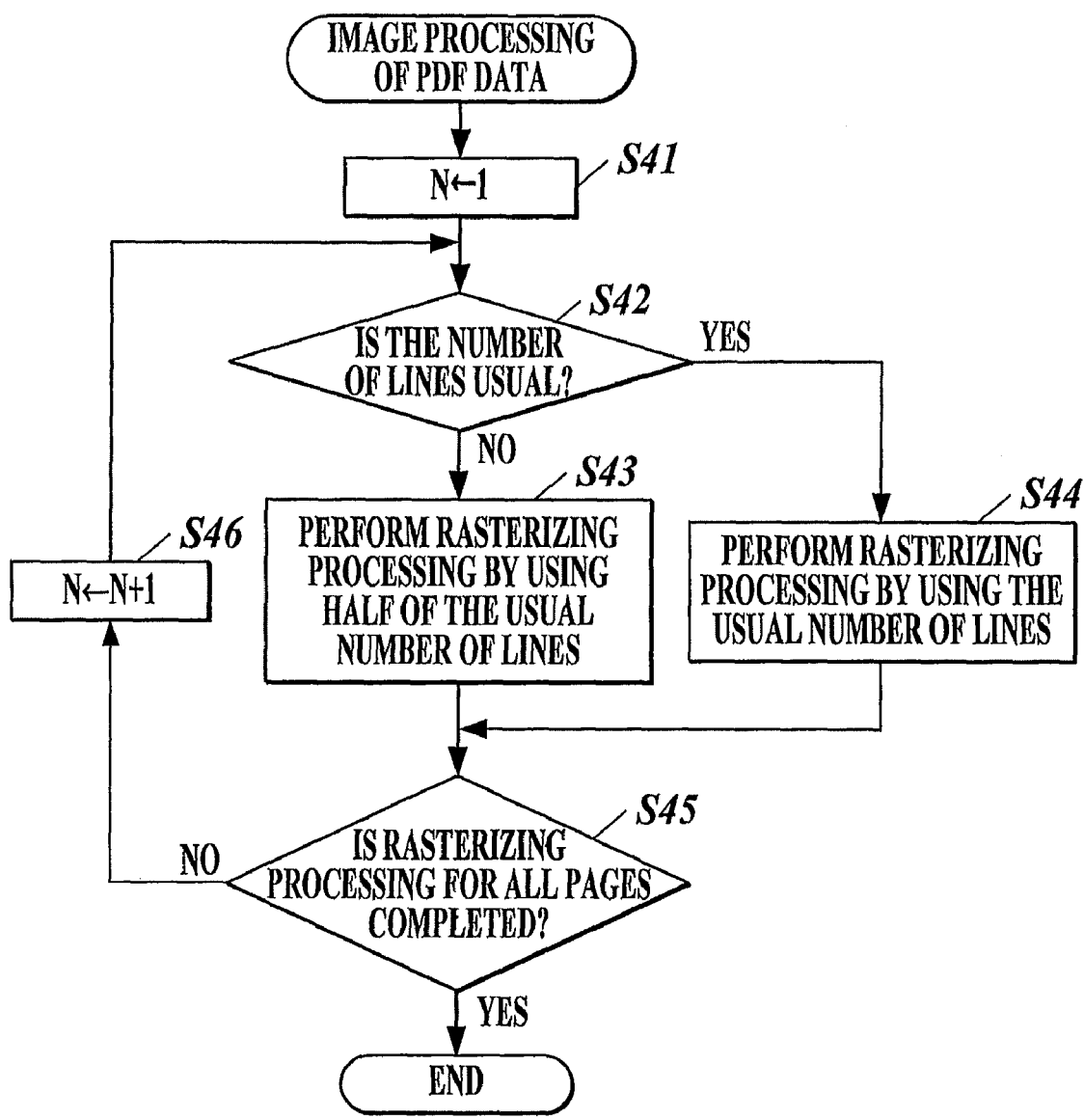
FIG. 12 is a flowchart showing the image processing of PDF data in the second embodiment.
Figure 13:
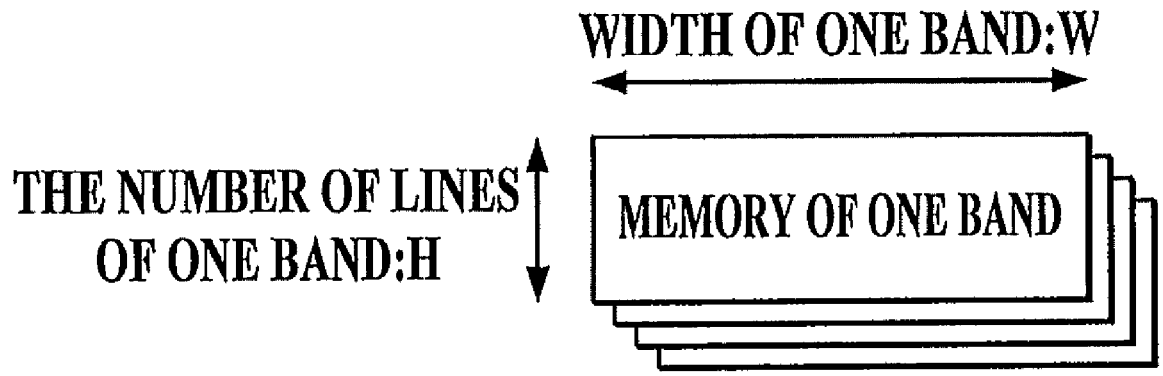
FIG. 13 is a view showing the memory size required to hold conventional bitmap data for one band.
Figure 14:
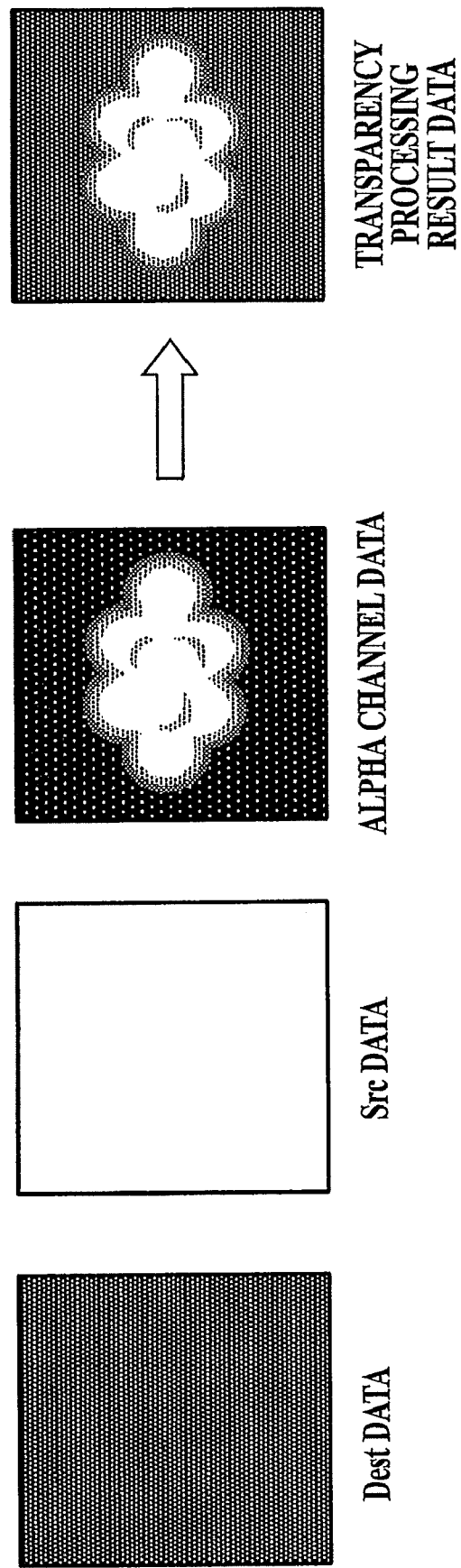
FIG. 14 is a view for explaining a transparency function of PDF.
Figure 16A:
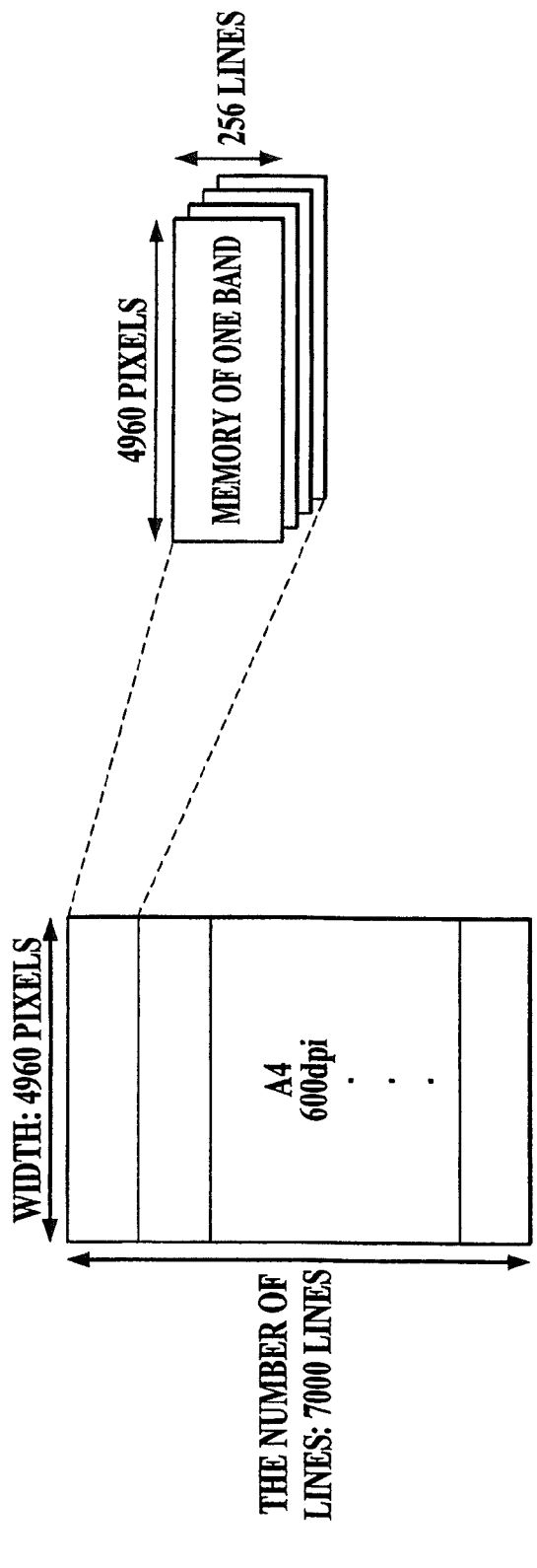
FIG. 16A is a specific example of the memory size required to hold the conventional bit map data for one band.
Figure 16B:
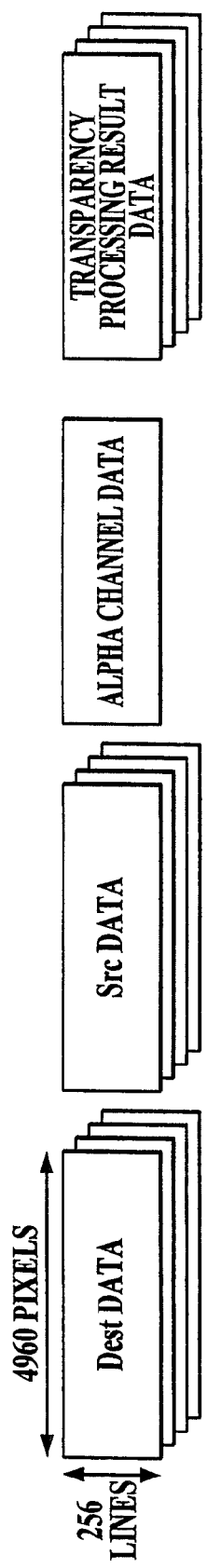
FIG. 16B is a specific example of the memory size required to perform the conventional transparency processing.

Next, the image processing for the PDF data will be explained with reference to FIG. 12.

First, the page number N is set to 1 as an initial value (Step S41). Here, the number-of-line information corresponding to an N-th page, which is stored in the RAM 33, is referred, and it is determined whether the number of the lines as the usual number or not (Step S42).

When the half of the usual number is stored as the number of lines information corresponding to the N-th page (Step S42; No), the rasterizing processing is performed for each band by using a half of the usual number of lines, and the bitmap data is generated (Step S43). In the rasterizing processing, the data for which the rasterizing processing is being performed, is held in the RAM 33.

Meanwhile, when the usual number of lines is stored as the number-of-line information corresponding to the N-th page (Step S42; Yes), the rasterizing processing is performed for each band by using the usual number of lines, and the bitmap data is generated (Step S44). In the rasterizing processing, the data for which the rasterizing processing is being performed, is held in the RAM 33.

After Step S43 or Step S44, when the rasterizing processing for all of the pages is not completed (Step S45; No), the value 1 is added to the page number N (Step S46), and the image processing returns to Step S42. When the rasterizing processing for all of the pages is completed (Step S45; Yes), the image processing of the PDF data is finished.

In case of the print data which is not the PDF data, the whole print data is rasterized for each band by using the usual number of lines, and the PDF data is generated.

As described above, according to the image forming apparatus 3 in the second embodiment, it is determined whether each page includes the transparency processing data or not, and in case of the page including the transparency processing data, the number of lines is switched to a smaller number of lines. Accordingly, even though the printing data includes the transparency processing data, the rasterizing processing can be performed by using a small memory size.

In the second embodiment, in case of the page including the transparency processing data, the number of lines of the band in the rasterizing processing is set to the half of the usual number of lines. However, by setting the number of lines to a smaller number, it is possible to further reduce the memory size required at the rasterizing processing.

Moreover, the explanations of each embodiment described above are examples of the image forming apparatus according to the present invention, and the present invention is not limited to the above explanations. Detailed configurations and detailed operations of each unit constructing the image forming apparatus can be appropriately changed without departing from the gist of the present invention.

For example, in each of the embodiments described above, the case that the PDF data is exemplified as the data that can include the transparency processing data, is explained. However, the data may be print data of other formats. For example, the transparency function plans to be installed also to Adobe Illustrator (registered trademark) file and Extensible Markup Language (XML) paper specification (XPS) file format of Microsoft.

What is claimed is:

1. An image forming apparatus, comprising:
a language analysis unit for analyzing pint data and generating data having an intermediate format between the print data and bitmap data generated based on the print data;
an image processing unit for rasterizing the generated data having the intermediate format for each band by using the predetermined number of lines and generating the bitmap data;
a memory for holding the data for which rasterizing processing is being performed by the image processing unit;
a printing unit for performing printing based on the generated bitmap data; and
a number-of-line switching unit for switching the number of lines of the band in the rasterizing processing of the image processing unit according to whether each page of the print data includes transparency processing data or not, wherein
in the print data, a series of transparency processing which is performed in the rasterizing processing of the image processing unit can be specified, the series of transparency processing including first transparency processing in which source data to be newly added to destination data, which is a background, is allowed to be transparent according to alpha channel data which can indicate opacity for each pixel to obtain a first transparency processing result data, and including second transparency processing in which the first transparency processing result data is used as the destination data or the source data to obtain a second transparency processing result data; the transparency processing data indicates the destination data, the source data, and the alpha channel data; when a page includes the transparency processing data, the number-of-line switching unit switches the number of lines to the smaller number of lines as compared with a case where the page does not include the transparency processing data; and
the image processing unit allows the memory to hold the data for which the rasterizing processing is being performed by using an area having a size according to the number of lines switched by the number-of-line switching unit, the area being ensured in the memory as a work area for the rasterizing processing.

2. An image forming method, comprising:
analyzing print data and generating data having an intermediate format between the print data and bitmap data generated based on the print data;

rasterizing the generated data having the intermediate format for each band by using the predetermined number of lines and generating the bitmap data;
performing printing based on the generated bitmap data; and
switching the number of lines of the band in the rasterizing of the generated data according to whether each page of the print data includes transparency processing data or not,
wherein in the rasterizing, the data that is being rasterized is held in a memory;
in the print data, a series of transparency processing which is performed in the rasterizing can be specified, the series of transparency processing including first transparency processing in which source data to be newly added to destination data, which is a background, is allowed to be transparent according to alpha channel data which can indicate opacity for each pixel to obtain a first transparency processing result data, and including second transparency processing in which the first transparency processing result data is used as the destination data or the source data to obtain a second transparency processing result data;
the transparency processing data indicates the destination data, the source data, and the alpha channel data;
when a page includes the transparency processing data, the number of lines is switched to the smaller number of lines as compared with a case where the page does not include the transparency processing data; and
the memory is allowed to hold the data for which the rasterizing is being performed by using an area having a size according to the switched number of lines, the area being ensured in the memory as a work area for the rasterizing.

3. A non-transitory computer-readable recording medium for storing a program, wherein the program causes a computer to realize:
a language analysis function for analyzing print data and generating data having an intermediate format between the print data and bitmap data generated based on the print data;
an image processing function for rasterizing the generated data having the intermediate format for each band by using the predetermined number of lines and generating the bitmap data;
a holding function for allowing a memory to hold the data for which rasterizing processing is being performed by the image processing function;
a printing control function for allowing a printing unit to perform printing based on the generated bitmap data; and
a number-of-line switching function for switching the number of lines of the band in the rasterizing processing of the image processing function according to whether each page of the print data includes transparency processing data or not, wherein
in the print data, a series of transparency processing which is performed in the rasterizing processing of the image processing function can be specified, the series of transparency processing including first transparency processing in which source data to be newly added to destination data, which is a background, is allowed to be transparent according to alpha channel data which can indicate opacity for each pixel to obtain a first transparency processing result data, and including second transparency processing in which the first transparency processing result data is used as the destination data or the source data to obtain a second transparency processing result data;
the transparency processing data indicates the destination data, the source data, and the alpha channel data;
when a page includes the transparency processing data, the number-of-line switching function is one for switching the number of lines to the smaller number of lines as compared with a case where the page does not include the transparency processing data; and
the image processing function allows the memory to hold the data for which the rasterizing processing is being performed using an area having a size according to the number of lines switched by the number-of-line switching function, the area being ensured in the memory as a work area for the rasterizing processing.

* * * * *